(12) United States Patent
Calvignac et al.

(10) Patent No.: US 6,532,185 B2
(45) Date of Patent: Mar. 11, 2003

(54) DISTRIBUTION OF BANK ACCESSES IN A MULTIPLE BANK DRAM USED AS A DATA BUFFER

(75) Inventors: Jean Louis Calvignac, Cary, NC (US); Peter Irma August Barri, Bonheiden (BE); Ivan Oscar Clemminck, St-Amandsberg (BE); Kent Harold Haselhorst, Byron, MN (US); Marco C. Heddes, Raleigh, NC (US); Joseph Franklin Logan, Raleigh, NC (US); Bart Joseph Gerard Pauwels, Tessenderlo (BE); Fabrice Jean Verplanken, La Gaude (FR); Miroslav Vrana, Ghent (BE)

(73) Assignees: International Business Machines Corporation, Armonk, NY (US); Alcatel, Paris (FR)

( * ) Notice: Subject to any disclaimer, the term of this patent is extended or adjusted under 35 U.S.C. 154(b) by 6 days.

(21) Appl. No.: 09/792,605

(22) Filed: Feb. 23, 2001

(65) Prior Publication Data

US 2002/0149989 A1 Oct. 17, 2002

(51) Int. Cl.[7] ................................................. G11C 8/00
(52) U.S. Cl. ................ 365/230.03; 365/221; 365/238.5
(58) Field of Search ........................ 365/230.03, 221, 365/238.5, 239

(56) References Cited

U.S. PATENT DOCUMENTS

| | | | | | |
|---|---|---|---|---|---|
| 5,040,149 A | * | 8/1991 | Ebihara et al. | ......... | 365/189.05 |
| 5,398,209 A | * | 3/1995 | Iwakiri et al. | ......... | 365/230.03 |
| 5,881,016 A | * | 3/1999 | Kenkare et al. | ....... | 365/230.03 |
| 5,959,929 A | | 9/1999 | Cowles et al. | ......... | 365/230.03 |
| 5,982,698 A | | 11/1999 | Tsukude | ................ | 365/230.03 |
| 6,009,019 A | | 12/1999 | Fang | ..................... | 365/189.02 |
| 6,081,468 A | | 6/2000 | Taira et al. | ................. | 365/203 |

* cited by examiner

Primary Examiner—Son T. Dinh
(74) Attorney, Agent, or Firm—Driggs, Lucas, Brubaker & Hogg; James A. Lucas

(57) ABSTRACT

Network processors commonly utilize DRAM chips for the storage of data. Each DRAM chip contains multiple banks for quick storage of data and access to that data. Latency in the transfer or the 'write' of data into memory can occur because of a phenomenon referred to as memory bank polarization. By a procedure called quadword rotation, this latency effect is effectively eliminated. Data frames received by the network processor are transferred to a receive queue (FIFO). The frames are divided into segments that are written into the memory of the DRAM in accordance with a formula that rotates the distribution of each segment into the memory banks of the DRAM.

16 Claims, 2 Drawing Sheets

DISTRIBUTION OF BANK ACCESSES IN A MULTIPLE BANK DRAM USED AS A DATA BUFFER

FIELD OF THE INVENTION

This invention relates to processors, such as network processors that use bank access in a multiple bank dynamic random access memory (DRAM) chip. More particularly, it relates to improvements in network processors that use multiple bank synchronous DRAMs as data buffers.

BACKGROUND OF INVENTION

Digital computers commonly use DRAM chips for the storage of retrievable data. In synchronous DRAMs, the memory is typically organized into several (usually 4) memory banks per memory module within the chip. In this embodiment, each bank holds 16 bytes of data corresponding to one quadword. Thus, the buffer size for 4 banks is 64 bytes of data stored per memory module. These banks provide a comprehensive collection of the addressable storage space in a processing unit used to execute instructions. Logic can access one bank by overlapping with another bank. Thus, if two 'reads' are required, one 'read' command can be executed from a first bank followed by one from a second bank without waiting for the first 'read' to be completed.

Structures called frames contain control and user data that is transferred between the network processor and the DRAM. These frames are of random size and may range from 64 bytes up to 1500 bytes or more. Data is transferred from the frames to the memory banks in chunks or segments of 64 bytes each.

There is an ongoing impetus toward achieving greater access speed and reducing latency in the transfer of data into and out of memory. This is even more evident in a DDR DRAM (Double Data Rate Dynamic Random Access Memory) device wherein the interface between a chip and the DRAM transmits data on both the rising and the falling edges of a cycle clock. One environment in which this problem becomes particularly manifest is in a microprocessor that functions as a network processor (NP).

A problem that adversely affects the ability of a network processor to access multiple memory banks of a DRAM chip is a phenomenon referred to as polarization. This phenomenon occurs most often when each new frame is started in the same bank. For example, when new frames are always started in bank A of a four bank (A, B, C, D) memory module, this tends to underuse bank D because frames are of random length and, therefore, statistically can end in any bank. In addition, the processing of the header (typically 32 bytes) of each frame requires additional access to those banks in which the header is stored. Since the header information typically is stored at the beginning of the frame, banks A and B will be constantly accessed more frequently than banks C and D, thereby adding to the under utilization of banks C and D. This can be exemplified by visualizing the writing of several frames, each containing 72 bytes of data. If they are written into memory according to conventional practice, 16 bytes would be loaded sequentially into banks A, B, C, D, and A in that order. Thus, bank A gets used twice while the other banks get used once, contributing to a waste of bandwidth. If there are multiple frames of this size, the problem is further exacerbated each time an additional frame is loaded.

In network processor (NP) designs that are not limited by bandwidth (BW) requirements, memory bank polarization is not a concern because the latency associated with this phenomenon can be tolerated. High performance processors cannot tolerate this latency if they are to satisfy high bandwidth requirement (i.e. 10 Gbps). Although this problem did not require a solution in previous generations of network processors, a solution to this problem for high bandwidth network processors will help alleviate system latencies, thereby increasing performance. Greater speeds have been achieved by overlapping the bank accesses whereby one 'read' or one 'write' is sent to bank A and another 'read'0 or 'write' is sent to bank B. This second bank is programmed to start operation before bank A has completed its transfer. Greater bandwidth would be achievable by increasing the degree of overlap.

BRIEF DESCRIPTION OF THE INVENTION

The present invention relates to a method of randomly choosing the memory bank in which a new frame is begun to be stored, thereby minimizing DRAM polarization latency effects in a network processor. The method comprises the steps of a) receiving a frame from a network processor, said frame consisting of one or more segments; b) randomly assigning the segments of the frame to one of a plurality of banks within a memory module, and c) storing the first data byte pointer and the last data byte pointer of the frame segments in the memory module. Each segment typically contains up to 64 bytes of data and has a first or start data byte pointer (SBP) and a last or end data byte pointer (EBP). The segments are randomly assigned by quadword rotation, performed within a FIFO. Accordingly, the first data byte pointer (SBP) is determined according to the formula SBP=[(FR×1.6)+RP]mod 64, and the last data byte pointer (EBP) is determined according to the formula EBP=[(FR×16)+(IBC−1)+RP]mod64. In this formula, FR=a Quadword Rotation value between 0 and 3; RP=the Relative Position of incoming data related to a given buffer; IBC=the Incoming Byte Count, and 'mod 64'means that the summation is divided by 64, with the remainder being kept and the integer being disregarded.

The invention also includes a structure for minimizing DRAM polarization latency effects in a network processor. The structure includes means for receiving a frame from a network processor, said frame consisting of one or more segments, each segment typically being 64 bytes in size. Each segment has a start data byte pointer (SBP) and a last or end data byte pointer (EBP). Means are included for randomly assigning the segments of the frame to one of a plurality of banks within a memory module. Further means are included for storing the first data byte pointer and the last data byte pointer of the segments of the frame in the memory module. The segments are randomly assigned by quadword rotation within a FIFO. The first data byte pointer (SBP) is determined according to the formula SBP=[(FR×16)+RP] mod 64, and the last data byte pointer (EBP) is determined according to the formula EBP=[(FR×16)+(IBC−1)+RP]mod64.

The invention also relates to a network processing system and a method of writing multiple frames of data from a network processor into a memory bank of a DRAM. Frames of data are transferred into a FIFO as they are received by the network processor. Each frame is separated into segments of 64 bytes to match the size of one access to each memory module within the DRAM. The frames are delivered to banks within the DRAM on a random basis, whereby the start of frames is evenly distributed between the banks. The randomized delivery of segments is performed by quadword rotation within a FIFO buffer. The first data byte pointer (SBP) is determined according to the formula SBP=[(FR×16)+RP]mod 64, and the last data byte pointer (EBP) is determined according to the formula EBP=[(FR×16)+(IBC−1)+RP]mod64.

The invention also relates to a system and a method of randomly selecting a memory bank among multiple banks in a DRAM module in which to begin to write data from a frame. This involves a step of, or means for, dividing the data into segments, each of which has a start data byte pointer (SBP) and an end data byte pointer (EBP). This is then followed by rotating the segments by using the formula SBP=[(FR×16)+RP]mod 64, and using the formula EBP=[(FR×16)+(IBC−1)+RP]mod64 for determining the relative position of the incoming data relative to the memory banks. In these equations, FR represents a Quadword Rotation value between 0 and 3, RP represents the Relative Position of incoming data related to a given buffer, IBC is the Incoming Byte Count, and 'mod 64' means that the summation is divided by 64, with the remainder being kept and the integer being disregarded.

The quadword rotation of the present invention applies to the 'write' of data into the DRAM buffer or module. When the data is 'read' out of the DRAM buffer, the same rotation must be followed as that used for the 'write' command, to ensure that the data is read in the proper sequence.

DETAILED DESCRIPTION OF THE INVENTION

Figure 1:
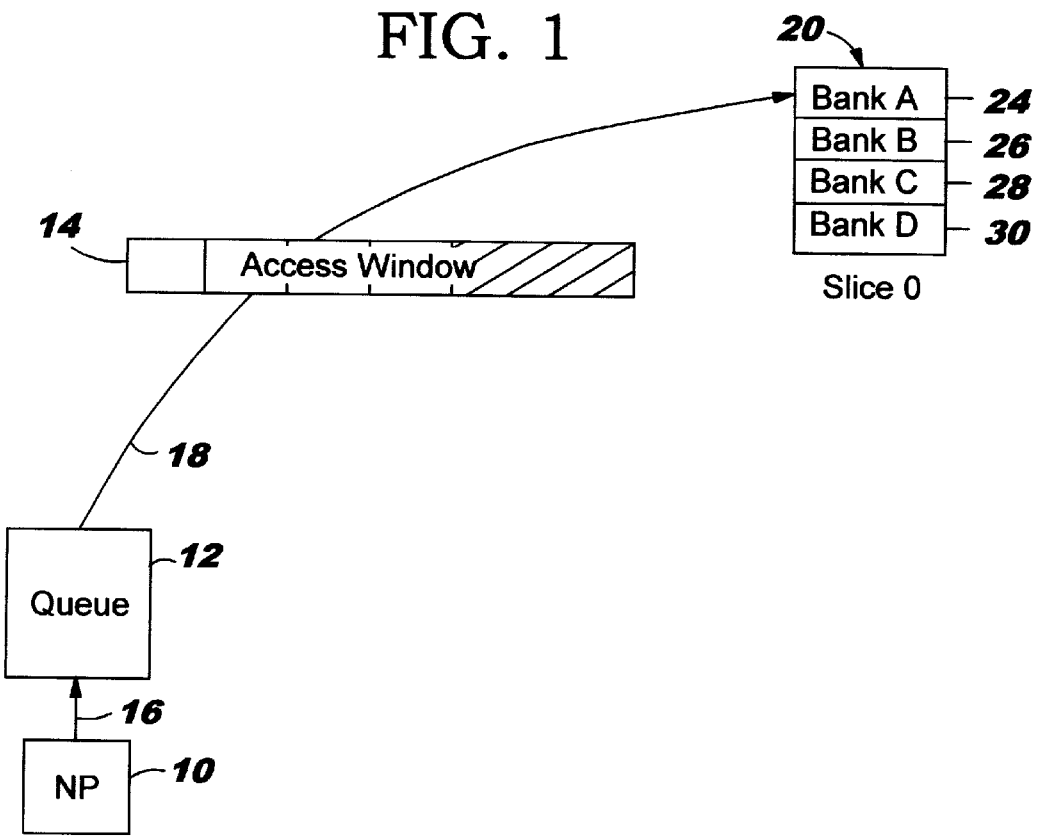
FIG. 1 is a diagrammatic representation of a present method for writing data into DRAM.

FIG. 1 depicts the environment in which this invention is embodied. A frame (16) is received by the network processor (10) and is temporarily stored in receive queue or FIFO (12). Each frame is divided into segments (18) matching the size of the memory bank in a DDR DRAM module (20) where the data is to be stored. In this embodiment, the DRAM module (20) is divided into four banks, labeled as bank A (24), bank B (26), bank C (28) and bank D (30). Each DRAM module is shown as a slice, with the first DRAM module being labeled Slice 0. Each bank holds one quadword (16 bytes) of data for a buffer size of 64 bytes (4 quadword per memory module per access 64 bytes of data stored per memory module access). A representative clock speed of 6 nanoseconds (ns) per cycle is used to transfer data through an access window (14), it being understood that the invention and its application are not necessarily dependent on the cycle speed or the number of cycles. Using a window width of 11 cycles (66 ns), typically 8 cycles are used for data transfer and the other 3 cycles are unavailable for pushing data, being instead used for other purposes. Each access window includes four time slots shown as A, B, C and D, each of which has a width of 12 nanoseconds.

As multiple frames are written to DDR DRAM, the order in which they are received by the network processor (10) in FIG. 1 remains fixed so that there is no randomness as to which quadword will be selected to store the beginning of a frame (16). This is shown in the access window (14) of FIG. 1, which is a view of data being transferred to memory in time. With no random rotation being applied, the beginning of a frame (1st 16 bytes or first quadword) will always be stored in bank A of a particular DRAM, thereby contributing to the polarization problem of DRAM modules previously described. The first segment (18) of four quadwords (64 bytes) of a particular frame (16) is transferred from the input queue to the DRAM module 20 in the same order (1, 2, 3, 4) that they are received from the network.

Figure 2:
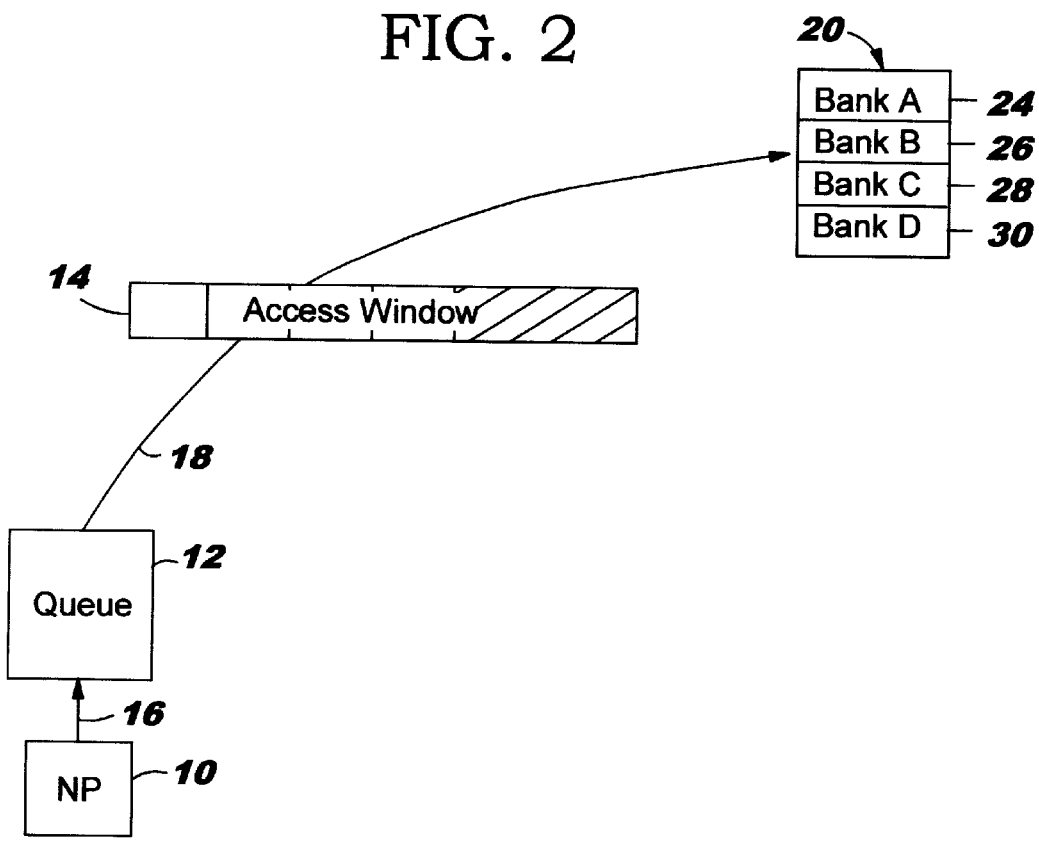
FIG. 2 shows a random quadword rotation of data being transferred from input FIFO to memory.

To minimize this polarization problem, a random quadword rotation is applied to data as it is transferred from the input FIFOs to memory. FIG. 2 depicts this solution as it applies to a single frame (16). As multiple segments are transferred to memory, a quadword rotation of one (1) is applied to the data. As shown in the access window (14), the order in which the data is received has been rotated by one (shift and rotate) when stored in memory. This access window (14) represents the implementation of an algorithm in logic circuits to provide the quadword rotation of the present invention. This is accomplished by applying a randomly generated quadword rotation value as previously described to data being stored in memory. Again referencing FIG. 2, a quadword rotation of one (1) results in the first frame segment (18) of 16 bytes being stored in bank B (26), which is the second DRAM bank in the module (20).

In order to avoid polarization of memory module banks during accesses, it is desirable to statistically start a frame in any quadword A, B, C or D. This is achieved by the "Quadword Rotation" mechanism which breaks the mapping of quadwords inside a Data Store buffer. The regular mapping is:

1st quadword in bank A
2nd quadword in bank B
3rd quadword in bank C
4th quadword in bank D Quadword Rotation is defined as storing the first quadword in any bank in sequence as follows:

Quadword Rotation=0: ABCD (Regular Mapping)
Quadword Rotation=1: BCDA
Quadword Rotation=2: CDAB
Quadword Rotation=3: DABC The Quadword Rotation is applied in a random manner during 'write' data movement and, thus, really corresponds to a reordering of the quadwords in an access window.

The effect of quadword rotation inside the buffer is signaled by the SBP and EBP fields of a Buffer Control Block (BCB):

SBP points to the first data byte in the buffer;
EBP points to the last data byte in the buffer.

The BCB typically includes 6-bit pointers that can point to any byte position of the 64 byte buffer (they do not operate on quadword boundaries). Therefore the SBP and EBP within the Buffer Control Block enable quadword rotation since these two fields point to the starting and ending byte positions within a buffer.

SBP and EBP are calculated as follows:

$$SBP=[FR\times16)+RP]mod64$$

$$EBP=[(FR\times16)+(IBC-1)+RP]mod64$$

Where:
FR=Quadword Rotation value (0, 1, 2 or 3)
RP=Relative position of incoming data related to given buffer (for more than one frame in given buffer, there is more than one frame offset)

IBC=Incoming Byte Count (Number of bytes between 1 and 64 of incoming data related to a given buffer and frame).

The following SBP and EBP values are determined from the equations previously identified:

$$SBP=[(1\times16)+0]mod64=16$$

$$EBP=[(1\times16)+(64-1)+0]mod64=15$$

Figure 3:
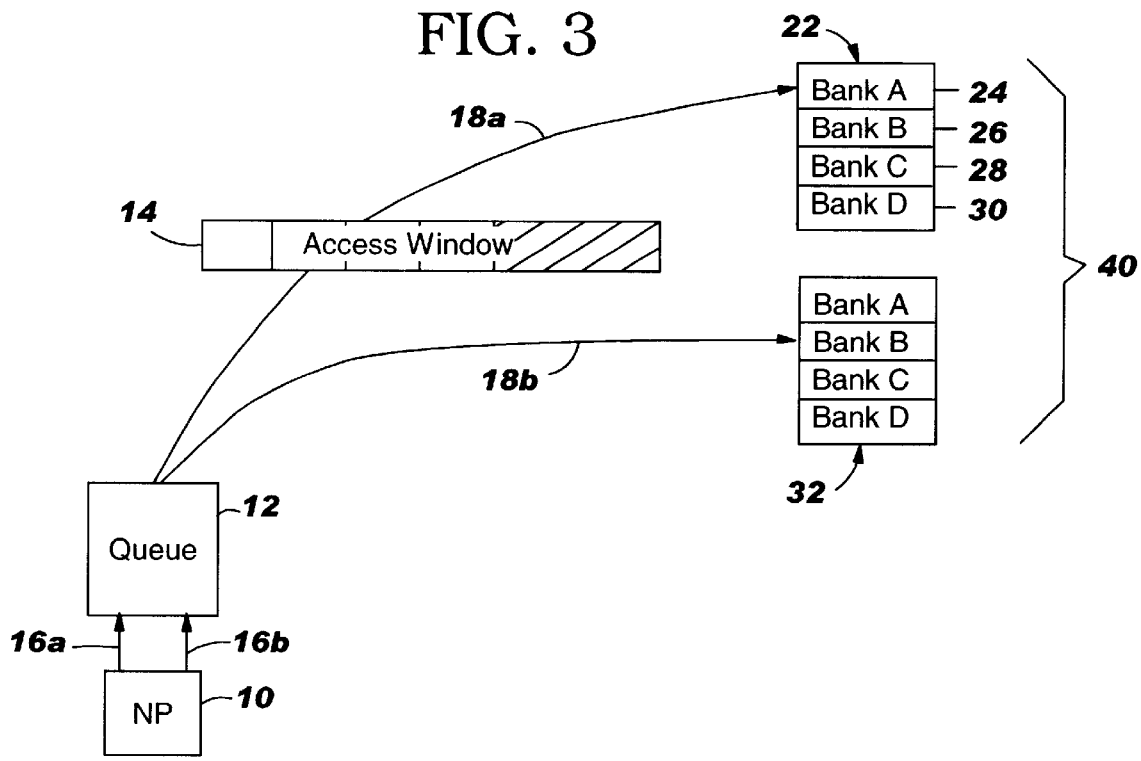
FIG. 3 shows a quadword rotation useful when the contents of two frames are contained in one FIFO.

FIG. 3 depicts the transfer of segments (18a, 18b) of 2 frames (16a) and (16b) from the FIFO queue (12) of network processor (10) into two buffers (22, 32) of a single slice 40. With a quadword rotation of three, the SBP and EBP are calculated for each buffer as follows (A=frame 16a, B=frame 16b):

$$SBPA=[(3\times16)+O]mod64=48$$

$$EBPA=[(3\times16)+(48-1)+O]mod64=31$$

$$SBPB=[(3\times16)+48]mod64=32$$

$$EBPB=[(3\times16)+(16-1)+4B]mod64=47$$

Thus, it is noted that the start pointer value of the segment (18b) of frame B (16b) immediately follows the end pointer value of the first segment (18a) of frame A (16a).

Figure 4:
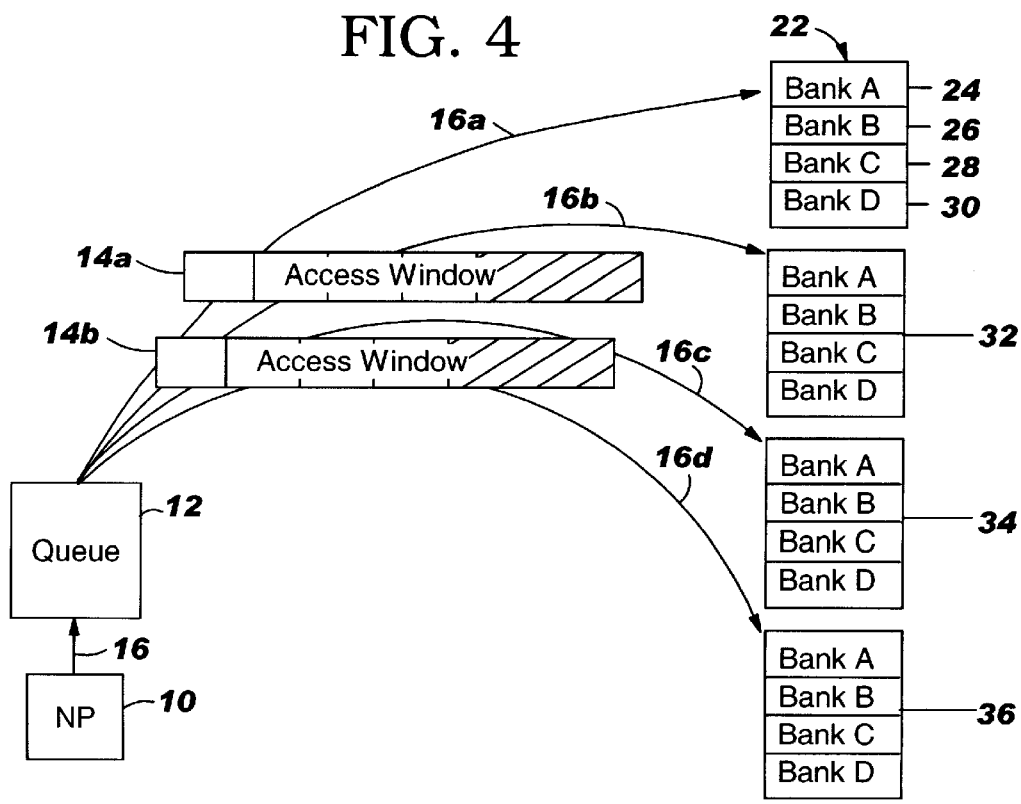
FIG. 4 shows a quadword rotation when multiple short frames are combined in one FIFO.

FIG. 4 shows several frames (16a, 16b, 16c, 16d) smaller than 64 bytes (e.g. 16 bytes each) written from a FIFO (12) of a network processor (10) through two access windows (14a and 14b) into the memory banks of four buffers (22, 32, 34, 36). These frames are shown being written into one of four buffers (22, 32, 34, 36). Two of the buffers (22 and 36) comprise a first slice or DRAM module and the other two buffers comprise a second slice or module. In this example, only two frames per access window are allowed, as determined by an arbiter, it being understood that the number of frames per window does not represent a limitation or condition, nor comprise a significant factor in the teachings of the present invention. Each access window has a bandwidth of 11 cycles, whereby the combined bandwidth for both access windows is 22 cycles. With a quadword rotation of zero (0) for the first access window (14a) and a quadword rotation of one (1) for the second access window (14b), the SBP and EBP are calculated for each buffer as follows: (A=slice 1, B=slice 2, C=slice 3, and D=slice 4):

Slice A:

$$SBPA=[(0\times16)+0]mod64=0$$

$$EBPA=[(0\times16)+(16-1)+0]mod64=15$$

Slice B $$SBPB=[(0\times16)+16]mod64=16$$

$$EBPB=[(0\times16)+(16-1)+16]mod64=31$$

Slice C:

$$SBPC=[(1\times16)+16]mod64=16$$

$$EBPC=[(1\times16)+(16-1)+16]mod64=31$$

Slice D:

$$SBPD=((1\times16)+32]mod64=32$$

$$EBPD=[(1\times16)+(16-1)+32]mod64=47$$

Thus, it is noted that the first two frames (16a, 16b) pass through the first access window (14a), with the first frame going into bank A of the first buffer (22), and the second frame going into bank B of the second buffer (32). The third and fourth frames pass through the second access window (14b) with the third frame (16c) being written into bank B of the third buffer (34), and the fourth frame (16d) being written into bank C of the fourth buffer (36). This random rotation of the quadwords assures an equal probability that any bank of the four buffers of the memory module will be selected to store the first segment of a given frame. There is no requirement as to which slice a segment is written. However, if two frames of less than 64 bytes are written at exactly the same time, they must be written to different slices. Thus, as shown in FIG. 4, there are two frames in time slot B. Therefore, one of the frames is written to a buffer in slice A and the other is written to a buffer in slice B.

An additional feature of the present invention is the encoding of specific information by playing on "illegal" SBP/EBP combinations. This is achieved by limiting the flexibility of the SBP and EBP pointers so that the EBP is less than the SBP when both SBP and EBP point to a position in the same quadword. This is a limitation which defines data wrapping on a quadword basis rather than on a byte basis. Such 'illegal' combinations can be used to encode control information, such as "empty buffer".

The details of network processors and DRAM chips are known to persons of ordinary skill in the art and do not comprise a part of the present invention except to the extent that they have been modified to become part of the present invention and interengage with other components of the system. The details relating to the architecture and the programming of the individual network processors useful in the present invention are not deemed to comprise a part of the present invention.

While the invention has been described in combination with embodiments thereof, it is evident that many alternatives, modifications, and variations will be apparent to those skilled in the art in light of the foregoing teachings. For example, the invention applies to other devices in addition to DRAMs in which memory has been divided into multiple banks. Furthermore, the invention is not limited in its application to DRAM modules having only four banks. Accordingly, the invention is intended to embrace all such alternatives, modifications and variations as fall within the spirit and scope of the appended claims.

What is claimed is:

1. A method of minimizing DRAM polarization latency effects in a network processing system comprising the steps of:

a) receiving a frame from a network processor, said frame consisting of one or more segments, each segment having a start data byte pointer (SBP) and an end data byte pointer (EBP);

b) randomly assigning the start of each segment of the frame to one of a plurality of banks within a memory module, and c) storing the first data byte pointer and the last data byte pointer of the frame segments in the assigned bank within the memory module.

2. The method according to claim 1 wherein each segment is randomly assigned by quadword rotation.

3. The method according to claim 2 wherein the quadword rotation is performed by determining the first data byte pointer (SBP) according to the formula SBP=[(FR×16)+RP] mod 64, and determining the last data byte pointer (EBP) according to the formula EBP=[(FR×16)+(IBC−1)+RP] mod64, wherein FR represents a Quadword Rotation value between 0 and 3, RP represents the Relative Position of incoming data related to a given buffer, IBC is the Incoming Byte Count, and 'mod 64' means that the summation is divided by 64, with the remainder being kept and the integer being disregarded.

4. The method according to claim 3 wherein data is wrapped on a quadword Basis, whereby the value of EBP becomes less than the value of SBP when they both point to a position in the same quadword.

5. A system for minimizing DRAM polarization latency effects in a network processor comprising:
   a) means for queuing a frame from a network in a FIFO, said frame consisting of one or more of segments, each segment having a start data byte pointer (SBP) and an end data byte pointer (EBP);
   b) means for randomly assigning the start of each segment of the frame to one of a plurality of banks within a memory module, and
   c) means for storing the first data byte pointer and the last data byte pointer of each segment of the frame in the memory module.

6. The system according to claim 5 wherein each segment is randomly assigned by quadword rotation.

7. The system according to claim 6 wherein the quadword rotation is performed by determining the first data byte pointer (SBP) according to the formula SBP=[(FR×16)+RP] mod 64, and determining the last data byte pointer (EBP) according to the formula EBP=[(FR×16)+(IBC−1)+RP] mod64, wherein FR represents a Quadword Rotation value between 0 and 3, RP represents the Relative Position of incoming data related to a given buffer, IBC is the Incoming Byte Count, and 'mod 64' means that the summation is divided by 64, with the remainder being kept and the integer being disregarded.

8. The system according to claim 7 wherein data is wrapped on a quadword basis, whereby the value of EBP becomes less than the value of SBP when they both point to a position in the same quadword.

9. The method of writing multiple frames of data from a network processor into a memory bank of a DRAM comprising:
   a) queuing the frames of data in a FIFO as they are received by the network processor;
   b) segmenting each frame in the FIFO to match the size of the memory banks within the DRAM, and
   c) delivering the frame segments to banks within the DRAM on a randomized basis, whereby the segments are evenly distributed between the banks.

10. The method according to claim 9 wherein randomized delivery of segments is performed by quadword rotation.

11. The method according to claim 10 wherein the quadword rotation is performed by determining the first data byte pointer (SBP) according to the formula SBP=[(FR×16)+RP] mod 64, and determining the last data byte pointer (EBP) according to the formula EBP=[(FR×16)+(IBC−1)+RP] mod64, wherein FR represents a Quadword Rotation value between 0 and 3, RP represents the Relative Position of incoming data related to a given buffer, IBC is the Incoming Byte Count, and 'mod 64' means that the summation is divided by 64, with the remainder being kept and the integer being disregarded.

12. A network processing system including:
   a) a network processor;
   b) at least one FIFO for receiving a frame from the network processor, the frame consisting of a plurality of discrete segments, each segment identified by a start data byte pointer (SDP) and an end data byte pointer (EDP);
   c) a memory module within a DRAM, said memory module containing a plurality of memory banks; and
   d) means for randomly assigning the segments to the memory banks.

13. The system according to claim 12 wherein randomized delivery of segments is performed by quadword rotation.

14. The system according to claim 13 wherein the quadword rotation is performed by determining first data byte pointer (SBP) according to the formula SBP=[(FR×16)+RP] mod 64, and determining the last data byte pointer (EBP) according to the formula EBP=[(FR×16)+(IBC−1)+RP] mod64, wherein FR represents a Quadword Rotation value between 0 and 3, RP represents the Relative Position of incoming data related to a given buffer, IBC is the Incoming Byte Count, and 'mod 64' means that the summation is divided by 64, with the remainder being kept and the integer being disregarded.

15. A method of randomly selecting a memory bank among multiple banks in a DRAM module in which to begin to write data from a frame, comprising
   a) dividing the data into segments, each of which has a start data byte pointer (SBP) and an end data byte pointer (EBP), and
   b) rotating the segments by using the formula SBP=[(FR×16)+RP]mod 64, to determine the SBP, and using the formula EBP=[(FR×16)+(IBC−1)+RP]mod64 for determining the starting position to the memory banks, wherein FR represents a Quadword Rotation value between 0 and 3, RP represents the Relative Position of incoming data related to a given module, IBC is the Incoming Byte Count, and 'mod 64' means that the summation is divided by 64, with the remainder being kept and the integer being disregarded.

16. A system for randomly selecting a memory bank among banks in a DRAM module in which to begin to write data from a frame, comprising
   a) means for dividing the data into segments, each of which has a start data byte pointer (SBP) and an end data byte pointer (EBP), and
   b) means for rotating the segments by using the formula SBP=[(FR×16)+RP]mod 64, to determine the SBP and, using the formula EBP=[(FR×16)+(IBC−1)+RP] mod64 for determining the starting incoming data relative to the memory banks, wherein FR represents a Quadword Rotation value between 0 and 3, RP represents the Relative Position of incoming data related to a given module, IBC is the Incoming Byte Count, and 'mod 64' means that the summation is divided by 64, with the remainder being kept and the integer being disregarded.

* * * * *